United States Patent [19]

Danford

[11] 3,865,056
[45] Feb. 11, 1975

[54] SEWAGE DISPOSAL SYSTEM AND APPARATUS

[75] Inventor: Jack De Wayne Danford, Watkins, Colo.

[73] Assignees: Jack D. Danford; H. H. Champlin

[22] Filed: June 15, 1972

[21] Appl. No.: 263,183

[52] U.S. Cl............... 111/7, 61/35, 172/170, 239/148
[51] Int. Cl. .......................................... A01c 23/02
[58] Field of Search ............... 111/1, 6, 7, 7.2, 7.3, 111/7.4, 85; 175/206; 61/35, 72.6; 47/48.5, 58, DIG. 4; 172/170; 239/148, 155, 175

[56] References Cited
UNITED STATES PATENTS

| 853,720 | 5/1907 | Murray | 111/7 X |
|---|---|---|---|
| 1,856,379 | 5/1932 | Foster | 111/7 |
| 2,003,186 | 5/1935 | Glassner | 172/170 |
| 2,475,686 | 7/1949 | Anderson | 111/7 X |
| 2,563,372 | 8/1951 | Risse | 111/7 X |
| 2,713,299 | 7/1955 | Shagger et al. | 111/7 X |
| 2,768,591 | 10/1956 | James | 111/7 |
| 2,849,970 | 9/1958 | Coberly et al. | 111/7 |
| 2,874,656 | 2/1959 | Bennett | 111/7 |
| 2,988,026 | 6/1961 | Heckathorn | 111/7 |
| 3,003,664 | 10/1961 | Cave | 111/7 X |
| 3,199,506 | 8/1965 | Bertin et al. | 37/12 X |
| 3,218,999 | 11/1965 | Pattison | 111/7 |
| 3,447,495 | 6/1969 | Miller et al. | 111/7 |
| 3,518,953 | 7/1970 | Johnston | 111/7 |
| 3,534,888 | 10/1970 | Mackinnon | 239/148 X |
| 3,581,685 | 6/1971 | Taylor | 111/7 |
| 3,610,184 | 10/1971 | Carroll | 111/7 |
| 3,625,166 | 12/1971 | Woodley | 111/7 |
| 3,628,728 | 12/1971 | Polutnik | 239/175 X |
| 3,693,838 | 9/1972 | Haker et al. | 239/155 X |
| 3,701,327 | 10/1972 | Krumholz | 111/85 X |
| 3,752,092 | 8/1973 | Vinyard | 111/7 |
| 3,753,409 | 8/1973 | Frazier | 111/6 |

FOREIGN PATENTS OR APPLICATIONS

| 1,129,759 | 1/1957 | France | 172/170 |
|---|---|---|---|
| 1,219,860 | 1/1971 | Great Britain | 111/7 |

OTHER PUBLICATIONS

"Land Reclamation", The Metropolitan Sanitary District of Greater Chicago, The Beneficial Utilization of Liquid Fertilizer, Vol. 40, No. 5, Part 1, 8/70, page 803.
"Proposal to the Metropolitan Denver Sewage Disposal District", 8-17-70, pgs. 2, 5, 13, 21, 22, 23, 24, 25, 26 and Appendix IV, pp. 1-5.

Primary Examiner—Edgar S. Burr
Assistant Examiner—E. H. Eickholt
Attorney, Agent, or Firm—Sheridan, Ross & Fields

[57] ABSTRACT

System includes transport means to carry sewage to holding pits or tanks in open areas remote from community and delivery from tanks to tunnels plowed in ground. Transport may be by tankers or pipeline. Tender tankers receive batches of sewage from storage tanks and deliver to field where tractors pull frames with depending plow members which produce tunnels in ground with narrow slashes or crevices extending to surface. Frames carry manifolds and discharge conduits to deliver sewage to tunnels. Tender tankers arranged beside tractors have supply conduits connecting them to manifolds, with pumps in conduits to produce continuous flow. Tankers travel in synchronism with tractors and deliver sewage to tunnels as they are formed. Compacting rollers pulled behind frames close crevices directly after they are formed by plow, and sewage is sealed into ground. The sewage provides moisture, nutrients, and humus at a proper sub-surface level to support crop growth for a year or more, and the same ground may be used for repeated disposals at suitable intervals.

11 Claims, 7 Drawing Figures

SEWAGE DISPOSAL SYSTEM AND APPARATUS

BACKGROUND OF THE INVENTION

This invention lies in the field of disposal of sewage from communities and is directed to a system, apparatus, and method which dispose of the sewage efficiently and without creating a nuisance while salvaging all of the beneficial components of the sewage for practical purposes and at the same time eliminating the cost and complication of elaborate sewage treatment plants and procedures.

The disposal of sewage has always been a problem, the magnitude of which varies with population density. Open pit dumping has been followed by septic tanks, dumping in streams, rivers, and oceans, and partial treatment and complete treatment, usually followed by dumping in streams, etc., although in some cases the reconstituted water has been used for irrigation purposes.

The older systems polluted the ground, water, and air and were inadequate at best while the new systems reduced or eliminated pollution from sewage but called for large and elaborate treatment plants which are very expensive to build and operate. It is well known that the problem has become critical in all but the most sparsely populated areas. While bulk can be greatly reduced by storing liquid sewage in open pits until the water has evaporated, the odors emanating from such pits are disagreeable and they pose a serious health hazard. Moreover, the solids must still be buried in trenches by one of the many known "sanitary" land fill methods.

SUMMARY OF THE INVENTION

The present invention overcomes the difficulties mentioned above and provides a system and method which are suitable for disposing of sewage from smaller communities and at least from the outlying areas of larger communities. In the latter case the burden on the treatment facilities for the central area is greatly reduced.

Generally stated, holding pits or tanks are located in an open area remote from a community, preferably where farming or ranching is already in effect or could be undertaken if growing conditions could be improved. A gathering zone at the community may be a storage tank or merely the terminus of the sewer system. The liquid sewage is transported from the gathering zone to the pits or tanks at the holding zone by mobile tankers of any type or by pipeline, depending on the economics of the particular situation. From the storage or holding tanks or reservoirs, the sewage is transported in batches by tender tankers to locations in the open area where disposal is about to be accomplished.

At any one such location, a tractor is provided to tow a sewage disposer which generally comprises a main frame, at least one narrow shank depending from the frame, and a plow member at the lower end of the shank which is substantially wider than the shank to form a tunnel of suitable cross section as the plow member is pulled through the ground at a selected distance beneath the surface. Preferably two or more shanks and plow members are carried by one frame. A manifold is carried by the frame and means are provided for discharging sewage from the manifold into the tunnel or tunnels. Preferably this takes the form of a conduit connected at its upper end to the manifold and having a dispensing port at its lower end to discharge into the tunnel behind the plow member. A supply conduit is connected at a first end to the manifold.

To carry out the operation, the tender tanker is arranged alongside the tractor and frame at a suitable distance and the second end of the conduit is connected to a discharge port on the tanker. A pump is incorporated in the conduit to produce a continuous flow of sewage from the tanker to the manifold and is preferably driven by a power takeoff on the tractor. The tractor and tanker then move forward in synchronism and sewage is discharged into the tunnel continuously to fill it as it is formed. A compacting roller mounted behind the frame closes the crevice made by the shank directly after it is formed so that the tunnel is sealed off and no odors or gases can escape.

In order to vary the cross section of the tunnel as desired, the width of the plow member foot is varied by providing members at each side which may be forced apart by suitable power operating means. In the preferred form these members are wings pivoted at their forward ends to the side walls of the foot, although they may take other forms if desired.

BRIEF DESCRIPTION OF THE DRAWINGS

Various other advantages and features of novelty will become apparent as the description proceeds in conjunction with the accompanying drawings, in which.

DESCRIPTION OF PREFERRED EMBODIMENTS

Figure 1:
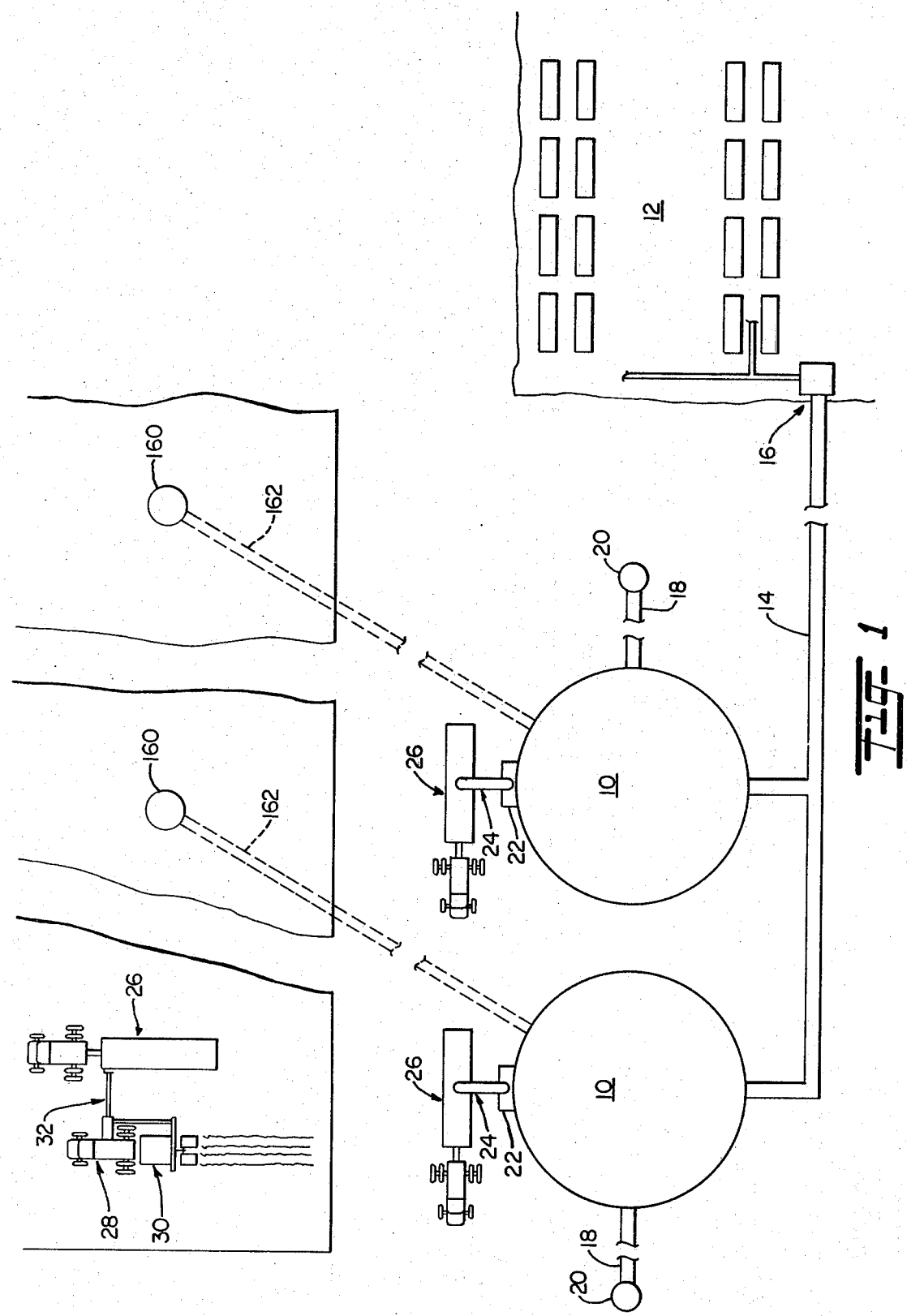
FIG. 1 is a schematic plan view of the system.

A sewage disposal system in accordance with the principles of the present invention is illustrated schematically in highly idealized form in FIG. 1, in which one or more large holding pits or tanks 10 are located in an open area remote from the community 12 which may be distant from a few miles to 15 miles or more. While any type of transport means may be used, the means illustrated is a pipeline 14 extending from gathering zone 16 to tanks 10. The gathering zone may be a storage tank or merely the terminus of the sewer system. If the sewage is of such nature that it produces noxious odors or gases such as methane, the reservoirs are in the form of enclosed tanks connected by conduits 18 to flare pipes 20 where the emitted gas is burned.

Each tank or reservoir 10 is provided with a loading dock 22 having a dispensing conduit 24 to deliver a batch of sewage to a mobile tender tanker 26. Each filled tanker travels to a location in the open area, such as a farm or ranch layout, where a tractor 28 is connected to a disposer 30. Upon arrival, the tanker is stationed beside the tractor, and a supply conduit 32 connects the tanker to a manifold on the disposer. When flow is established through the conduit, the tractor and tanker move forward in synchronism and the disposer forms a tunnel, deposits the sewage in the tunnel and closes the crevice in the ground to seal the tunnel.

Figure 2:
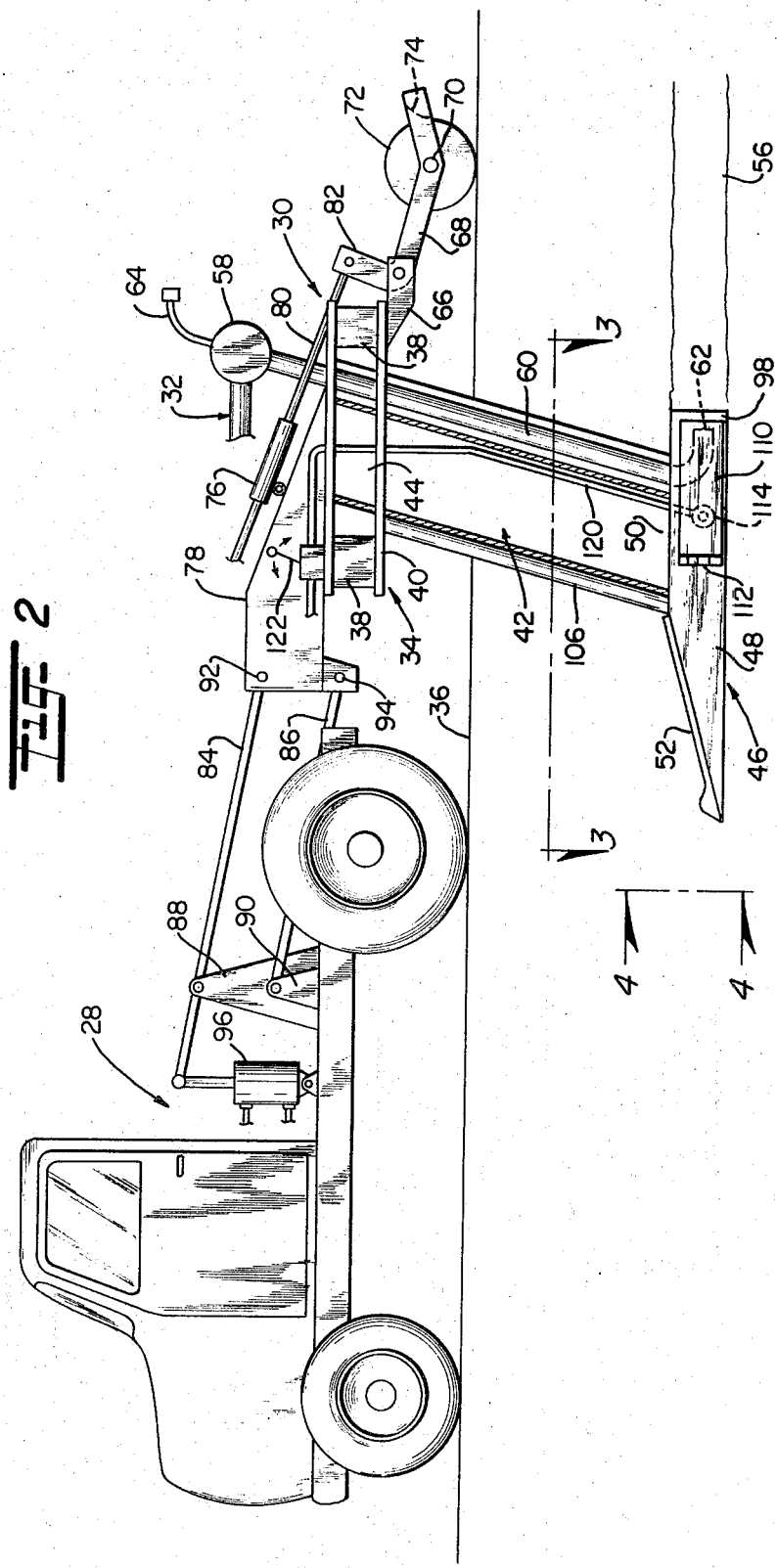
FIG. 2 is a schematic view in side elevation of the tractor and disposer in operation.
Figure 3:
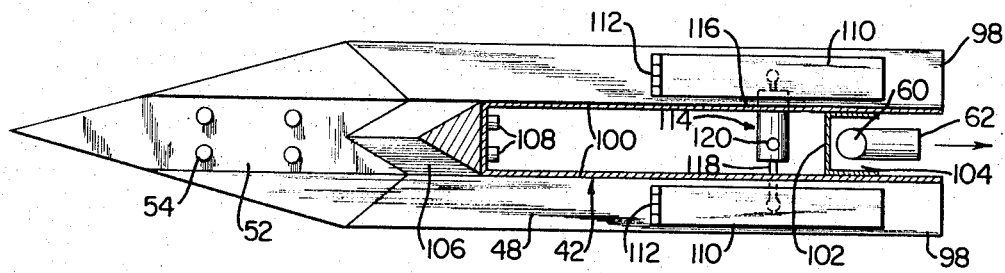
FIG. 3 is a sectional view taken on line 3—3 of FIG. 2.
Figure 4:
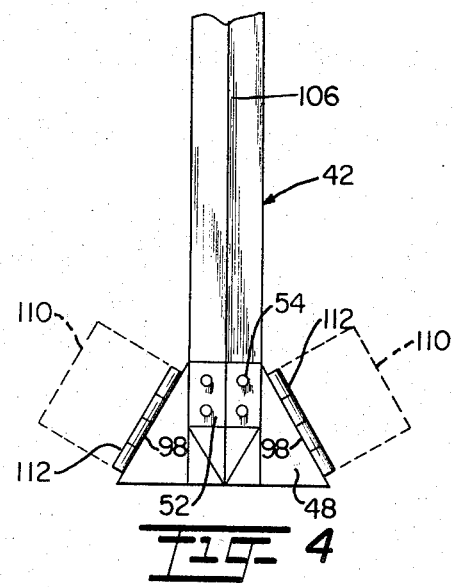
FIG. 4 is a sectional view taken on line 4—4 of FIG. 2.

Details of construction of the tractor and disposer are schematically illustrated in FIGS. 2, 3, and 4. The disposer includes a main frame 34 which may be an open structure located in a generally horizontal plane and positioned at a selected level above the surface of the ground 36. Beams 38 extend laterally and are connected by a suitable number of longitudinal stringers 40 to form a support for the other components. Several plowing devices may be arranged in laterally spaced relation across the extent of the frame but only one is shown for clarity.

A shank 42 is fixedly secured at its upper end 44 to the frame and depends downward and preferably somewhat forward to penetrate the ground to the desired depth. A plow member 46 has an elongate foot 48 which is secured to the lower end 50 of the shank and extends a substantial distance forward thereof. The foot is tapered to converge forward as best seen in FIG. 3 and is provided with an elongate detachable ground-breaking tooth 52 secured to it by fasteners 54. As the main frame is pulled forward by tractor 28, the plow member, which is of substantially greater width than the shank, forms a tunnel 56 and the shank forms a narrow crevice, not shown, from the tunnel to the surface of the ground.

A manifold 58 extends laterally across the aft portion of the frame and is flow-connected to a depending discharge conduit 60 for each plowing device. Conduit 60 extends in a generally upright direction adjacent to the aft edge of shank 42 and is secured to the shank and the frame. At its lower end it is provided with a dispensing port 62 which preferably faces rearwardly to discharge the sewage into the tunnel as the latter is formed. Supply conduit 32 provides a continuous flow through the manifold. A flushing conduit 64 is flow-connected to the manifold at one end adjacent to the supply conduit and is adapted to be connected to a source of high pressure water for flushing out the manifold and discharge conduit on occasion.

Brackets 66 extend rearward from the lower aft edge of the main frame to pivotally mount wheel carriers 68. The latter are provided with transverse axles 70 for compression rollers 72, and also carry wheel scrapers 74 which keep the rollers cleared of an accumulation of dirt. A hydraulic servo motor 76, powered by the hydraulic power system of the tractor, is mounted on the brackets 78 and provided with a piston rod 80 connected to horns 82 on wheel carriers 68 to raise and lower the rollers and vary the pressure applied to the ground. It will be seen that the rollers act to compress the ground and close the crevices formed by the shanks directly after their formation to seal the tunnels before any gases or odors can escape.

Parallelogram type support bars 84 and 86 are pivotally mounted on pylons 88 and 90 on the tractor and at their aft ends are pivotally connected to brackets 78 at 92 and 94 to support the frame and plowing device and to position them at any desired elevation. Bar 84 extends forward of its pivotal mounting and is connected to servo motor 96 for actuation of the supporting linkage.

Side walls or plates 98 of foot 48 extend rearward of the aft end of the shank and to each side of the dispensing port 62 of the discharge duct 60 to protect it against damage and to prevent the intrusion of dirt which might plug the port. Shank 42 may be solid but preferably is formed with laterally spaced side walls 100 to define a hollow body. Partition 102 extends between the side walls forward of their aft edges to form a rearwardly opening channel 104, and conduit 60 is located within this channel to protect it against displacement and damage. While shank 42 may have an integral leading edge sharpened to cut through the soil, it is here provided with a separate elongate leading edge member 106 of generally triangular cross section detachably secured by fasteners 108 for sharpening and replacement.

It is difficult to work a very wide plow member down into the ground to commence the tunneling operation. Therefore the foot 48 of the plow member is provided with expanding members whch may be retracted while the plow member is being lowered to working position and then forced apart laterally to increase the effective cross section of the plow member and produce a tunnel of the desired size. As seen in FIGS. 2, 3, and 4, such members take the form of wings 110 pivotally mounted at their leading edges by hinges 112 to the side walls 98 of the foot on generally upright axes to swing laterally. Side walls 98 preferably diverge downward and therefore the aft ends of the wings also swing upward to some extent. Thus they exert a down load on the plowing device to assist in maintaining it at the desired level.

The means to control the divergence of the wings comprises a servo motor 114 arranged transversely between them with cylinder 116 connected to one wing and piston rod 118 connected to the other wing. Conduit means 120 extends from the servo motor up within the shank 42 to a hydraulic power pack 122 supplied by the hydraulic power system of the tractor.

Figure 5:
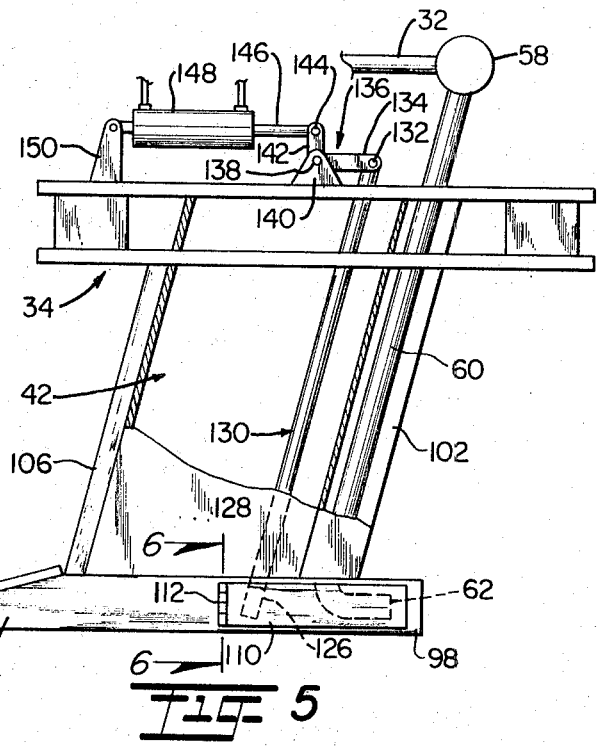
FIG. 5 is a partial schematic view in side elevation of a modified form of disposer.
Figure 6:
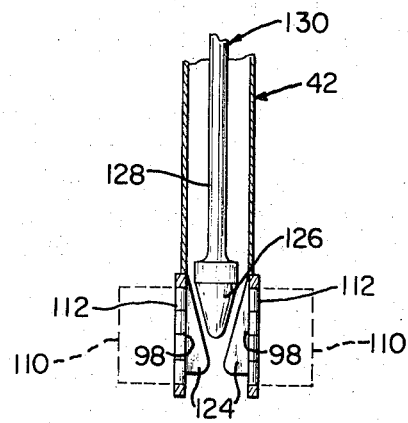
FIG. 6 is a sectional view taken on line 6—6 of FIG. 5.

A modified mechanism for controlling the divergence of the wings is illustrated in FIGS. 5 and 6. Instead of a servo motor located between the wings, a cam follower 124 is mounted on the inner side of each wing and a cam 126 is movably mounted to be driven between the cam followers to force the wings laterally apart. Cam 126 is mounted on the lower end 128 of actuator rod 130 which extends generally vertically up through the shank with its upper end pivotally connected at 132 to an arm 134 of bell crank 136, which is pivotally mounted at 138 on bracket 140. The other arm 142 of the bell crank is pivotally connected at 144 to piston rod 146 of the hydraulic servo motor 148 pivotally mounted on bracket 150. The servo motor is supplied by the hydraulic power system of the tractor.

Figure 7:
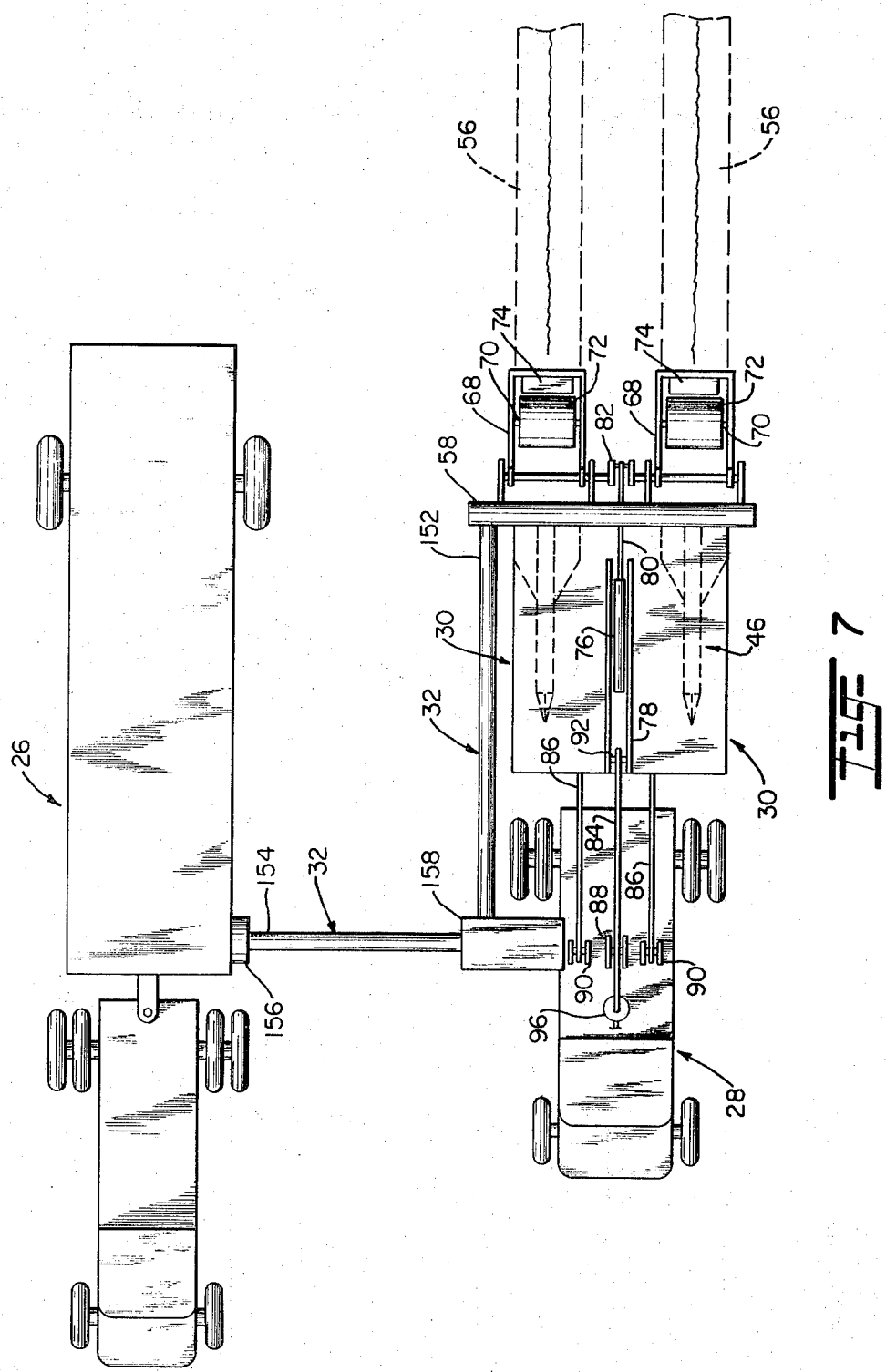
FIG. 7 is a schematic plan view of the tractor, disposer and tanker in operative relation.

FIG. 7 illustrates the relation of the tanker to the tractor and disposer during the disposal operation. A first end 152 of the supply conduit 32 is flow-connected to manifold 58 and the second end 154 is flow-connected to a port 156 on the tanker. Pumping means 158, incorporated in the conduit, is preferably mounted on the tractor and is driven by the tractor's power takeoff, not shown. The pump is operated continuously to fill the tunnels 56 at the same rate they are formed by plow members 46, and the two units move forward together at a rate of about 2 to 4 miles per hour, the rollers 72 closing the crevices above the tunnels directly after the shanks have passed.

A fleet of three to five tankers ensures that a full tanker will be available as soon as the previous tanker has been emptied even though the storage tank 10 is quite a distance away. Depending on the general size of the operation, which is related to the size of the community, equipment may be used which disposes of 100 to 2000 gallons per minute. Since the disposal site may vary in area from a few thousand to as much as 20,000 acres, some portions of the area may be so far from the main reservoir means that tanker haulage is impractical. In such cases, auxiliary loading stations 160 are provided at strategic locations as shown in FIG. 1 and are connected to the main reservoir means by auxiliary pipelines 162. Thus the haul for the tankers from the auxiliary loading stations to the operating locations of the tractors is reduced to a reasonable figure.

What is claimed is:

1. Sewage disposal apparatus comprising:
a main frame adapted to be positioned at a selected level above the surface of the ground;
at least one vertically elongate and laterally narrow shank secured to and depending from the frame and adapted to penetrate the ground to a selected depth;
a plow member secured to the lower end of the shank, including an axially elongate foot of substantially greater width than the shank to form a disposal tunnel beneath the surface of the ground;
controllably adjustable power operated servo means to vary the cross sectional area of the foot during operation of the apparatus to vary the cross sectional area of the tunnel formed by the plow member;
the shank including means defining a downwardly extending sewage discharge flow path from the vicinity of the frame to the vicinity of the plow member; and
a dispensing port at the lower end of the flow path to discharge sewage into the tunnel, and a supply manifold at the upper end of the flow path.

2. Apparatus as claimed in claim 1 wherein:
the foot includes movable members adapted to be displaced laterally in opposite directions to increase the effective cross sectional area of the foot and correspondingly enlarge the tunnel formed by the plow member; and
power operated means to control the lateral displacement of the members.

3. Apparatus as claimed in claim 2 wherein:
the movable members comprise wings pivotally mounted at their forward ends to the side walls of the foot to swing laterally to rearwardly divergent positions; and
the power operated means is controllable to vary the degree of divergence of the wings.

4. Apparatus as claimed in claim 3 wherein:
the foot has side walls that diverge downward and the wings swing upward as well as laterally to increase the down load on the plow member and assist in holding it at the desired depth.

5. Apparatus as claimed in claim 2 wherein:
the power operated means comprises an expansible hydraulic servo motor extending transversely between the members and connected to both of them to force them angularly apart.

6. Apparatus as claimed in claim 5 wherein:
a hydraulic power pack is mounted on the frame; and
a hydraulic conduit is connected at its upper end to the power pack and extends downward within the confines of the shank with its lower end connected to the servo motor to supply fluid thereto.

7. Apparatus as claimed in claim 2 wherein:
the movable members are provided at their inner sides with cam followers arranged in opposing relation;
a cam is provided to be forced between the cam followers to displace the members; and
the power operated means is connected to the cam to cause its movement.

8. Apparatus as claimed in claim 7 wherein:
the power operated means includes a hydraulic servo motor mounted on the frame and a generally vertically extending actuator rod connected at its upper end to the servo motor and at its lower end to the cam.

9. Apparatus as claimed in claim 2 wherein:
a supply conduit is flow-connected to the manifold and to a continuous source of supply;
pumping means is incorporated in the supply conduit to produce continuous flow; and
a flushing conduit is flow-connected to the manifold and adapted to be connected to a source of high pressure water for flushing out the manifold and the discharge flow path on occasion.

10. Apparatus as claimed in claim 1 wherein:
a tractor is provided to pull the shank and plow member forward through the ground;
upper and lower links are provided and are pivotally connected at their forward portions to the tractor and at their rearward portions to a forward section of the main frame, the forward and rearward pivotal connections having substantially the same vertical spacing to define a parallelogram support for the main frame and maintain it in substantially a constant attitude at all elevations;
and power operated means is provided on the tractor and connected to at least one of the links to raise and lower the rearward portion of the parallelogram support together with the main frame attached thereto while maintaining the attitude of the main frame substantially constant.

11. Apparatus as claimed in claim 10 wherein:
a roller is vertically movably mounted on the rearward end of the main frame;
and power operated means is mounted on the main frame and connected to the roller to vary its elevation with respect to the main frame and maintain it in pressural contact with the ground at all elevations of the main frame.

* * * * *